US007453901B2

(12) United States Patent
Jasper et al.

(10) Patent No.: US 7,453,901 B2
(45) Date of Patent: Nov. 18, 2008

(54) NETWORKS AND METHODS INTEGRATING DIGITAL MOBILE STANDARDS

(75) Inventors: Dan Jasper, Oregon City, OR (US); Cathy Wise, Bothell, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 956 days.

(21) Appl. No.: 10/445,173

(22) Filed: May 23, 2003

(65) Prior Publication Data

US 2004/0071153 A1 Apr. 15, 2004

Related U.S. Application Data

(60) Provisional application No. 60/383,477, filed on May 24, 2002.

(51) Int. Cl.
*H04L 12/28* (2006.01)
(52) U.S. Cl. ..................................... 370/431
(58) Field of Classification Search ................. 370/431
See application file for complete search history.

(56) References Cited

U.S. PATENT DOCUMENTS 6,396,827 B1 * 5/2002 Paivike et al. ............... 370/347
6,430,186 B1 * 8/2002 Smetana et al. ............ 370/395.4
6,912,230 B1 * 6/2005 Salkini et al. ................ 370/466
6,983,156 B2 * 1/2006 Fukushima et al. ...... 455/456.1
2003/0126211 A1 * 7/2003 Anttila et al. ............... 709/205
2004/0209580 A1 * 10/2004 Bose et al. .................. 455/103

OTHER PUBLICATIONS

Titan 532L Cross Connect Generator, Tellabs Operation, Inc,4951 Indianna Ave, May 22, 2000.*
Adit Service Card, Quad T1 Network Access/Drop-and-Inset Cart, CarrierAccess, Part No. 740-0044.
Network Valet, Element Management System (EMS), CarrierAccess, Release 1.1, Part: 750-0028.

* cited by examiner

*Primary Examiner*—Edan Orgad
*Assistant Examiner*—Blanche Wong
(74) *Attorney, Agent, or Firm*—Davis Wright Tremaine LLP; Michael J. Donohue; Heather M. Colburn

(57) ABSTRACT

Communications in a wireless communication system based on two or more communication standards are configured for delivery to cell sites or to subscribers using a digital link having channels assigned to the two or more communication standards. A T-1 level can be divided into twenty four channels that are assigned to two or more mobile standards, and subscriber or network communications based on the two or more standards can be delivered to, for example, radio transmitters associated with the mobile standards. Channel allocation can be revised based upon requested capacity associated with the mobile standards.

10 Claims, 5 Drawing Sheets

GSM/TDMA

NETWORKS AND METHODS INTEGRATING DIGITAL MOBILE STANDARDS

RELATED APPLICATIONS

This application claims the benefit of Provisional application No. 60/383,477, filed May 24, 2002, that is incorporated herein by reference.

TECHNICAL FIELD

The disclosure pertains to multi-standard mobile communication methods and apparatus.

BACKGROUND

Wireless communication systems continue to evolve in order to provide subscribers alternative or enhanced services, and to permit more efficient use of available radio bandwidth. For example, wireless communication systems have successfully migrated from an all analog configuration (AMPS) to standards that provide digital communication such as IS-136. In such service migrations, continued support for an installed standard is generally necessary in order to maintain service for current subscribers. If services provided according to a particular standard are discontinued, then subscriber service can be disrupted while subscribers acquire new mobile stations or other hardware, or reconfigure installed hardware to conform to newly introduced requirements. Because of the disruption, inconvenience, and expense associated with service migration, service migration can prompt subscribers to consider subscribing to services offered by other service providers. Because service providers consider retaining current customers to be an important business objective, installed services continued to be offered and supported as new features or services are added.

In a typical mobile network, radio transmitters and associated antennas are remotely located at numerous cell sites, and communication with the remote cell sites is accomplished using a wired connection, typically a digital link based on, for example, a so-called T-1 level. Generally the introduction of services based on new or additional standards requires providing additional digital or other communication links to the cell sites as well as additional transmitters and antennas. The cost of additional digital links to the cell sites can be substantial, and in some cases, additional links must be installed. Thus, providing dedicated digital links or other communication links to cell sites to support each available mobile standard can be prohibitively expensive. Therefore, methods and apparatus that facilitate multi-standard operations are needed.

SUMMARY

Communication methods comprise selecting a digital transmission link having an available data rate and dividing the available data rate into a plurality of data channels. A first communication channel is assigned to communications based on a first communication standard and a second communication channel is assigned to communications based on a second communication standard. In representative examples, the available data rate corresponds to a Trunk Level 1 (T-1) data rate, and the data rate is divided into twenty four channels. In other examples, the available data rate corresponds to an E-1 data rate, and the data rate is divided into thirty two channels. In other representative examples, the data channels are associated with time slots. In other examples, the first communication standard corresponds to a GSM standard, and the second communication standard corresponds to an IS-136 standard.

Multiplexers for wireless communication comprise a first input configured to receive a communication based on a first communication standard and insert the received first communication into a first channel defined on a transmission link. A second input is configured to receive a communication based on a second communication standard and insert the received second communication into a second channel defined on the transmission link. In representative examples, an output is configured to deliver the first communication and the second communication to a destination. According to representative examples, the first communication standard is based on a GSM standard or an IS-136 standard. In other examples, the first communication standard is an analog communication standard. In additional examples, the transmission link is based on a T-1 level or an E-1 level.

Methods of processing communications for wireless distribution comprise extracting a first communication and a second communication associated with a first communication standard and a second communication standard, respectively, from a transmission link. The first communication and second communication are delivered to a first radio transmitter and a second radio transmitter, respectively. Additional methods of processing communications for wireless distribution comprise inserting a first communication and a second communication associated with a first communication standard and a second communication standard, respectively, into respective time slots on a digital link. The first communication and the second communication are delivered to a destination on the digital link. In representative examples, the digital link is associated with an E-1 or a T-1 level.

Methods of allocating digital link capacity comprise dividing a digital link into a plurality of channels and assigning communications based on at least two mobile standards to respective channels. In some examples, the channels are associated with time slots defined in the digital link. In representative examples, the digital link is based on a T-1 level and is divided into twenty four channels. In additional examples, the digital link is based on an E-1 level and is divided into thirty two channels. In additional representative examples, the at least two mobile standards include at least one of IS-136, GSM, and IS-95.

Multi-standard mobile communication systems comprise a cell site having a first radio transmitter and a second radio transmitter associated with a first mobile standard and a second mobile standard, respectively. A digital link that is configured to communicate with the cell site has at least one channel assigned to the first mobile standard and at least one channel assigned to the second mobile standard. A controller is configured to select a number of channels assigned to the first communication standard and the second communication standard.

Demultiplexers for wireless communication comprise an input configured to receive a signal associated with a digital link. A processor is configured to identify a communication associated with a first channel of the digital link and a communication associated with a second channel of a communication link. A first output is configured to receive the communication associated with the first channel of the digital link, and a second output is configured to receive the communication associated with the second channel. In representative examples, the first communication is associated with a first communication standard and the second communication is associated with a second communication standard that is different than the first communication standard. In particular examples, at least one of the first and second communication standards is a GSM standard or an IS-136 standard. In additional examples, the processor is configured to identify communications based on channels defined in a T-1 or and E-1 level.

Methods of sharing transmission capacity of a transmission medium comprise selecting a first communication protocol and a second communication protocol, and assigning portions of the transmission capacity to the first communication protocol and the second communication protocol. In some examples, the transmission medium is associated with a T-1 level. In other examples, at least one of the first and second communication protocols is associated with a GSM standard, an IS-136 standard, or an IS-95 standard. In a particular example, the first protocol is an IS-136 protocol and the second protocol is a GSM protocol. In another representative example, the first protocol is a W-CDMA protocol and the second protocol is a GSM protocol. In yet another representative example, the first protocol is an IS-95 protocol and the second protocol is a W-CDMA protocol or the first protocol is a GSM protocol and the second protocol is a cdma2000 protocol.

These and other features are described below with reference to the accompanying drawings.

DETAILED DESCRIPTION

Integration of multiple communication standards in a communication network that includes a wireless network typically requires providing dedicated hardware corresponding to each standard or protocol for each base station, substantially increasing network costs. As a result, services associated with newer or different communication standards remain unavailable to network subscribers. In some networks, additional facilities are unavailable for implementation of so-called second generation (2G), second and one-half generation (2.5G), and third generation (3G) technologies. Surprisingly, a single carrier system can be configured to support different wireless technologies such as the Digital Advanced Mobile Phone Service (D-AMPS) standard and the Global System for Mobile Communication (GSM) standard. D-AMPS and GSM use time division multiple access (TDMA) but in substantially different formats, and communication signals conforming to these standards cannot be directly combined. However, by configuring a digital cross-connect so that signal timeslots at a cell site or elsewhere in a network are mapped to a selected standard or technology, signals associated with these timeslots can be delivered to, or received from, systems associated with the selected standard or technology. Network complexity and cost can be reduced by, for example, avoiding installation of additional DS-1 or other links to communicate signals associated with a standard that is to be added to the network service.

Examples are described with reference to D-AMPS and GSM. For convenience, D-AMPS is referred to as Interim Standard 136 (IS-136), or more simply as "TDMA." In other examples, additional standards can be included, such as standards based on code division multiple access (CDMA) or other mobile standards. For example, protocols such as those described in IS-95, cdma2000, wideband code-division multiple-access (W-CDMA) standards can be used.

Figure 1:
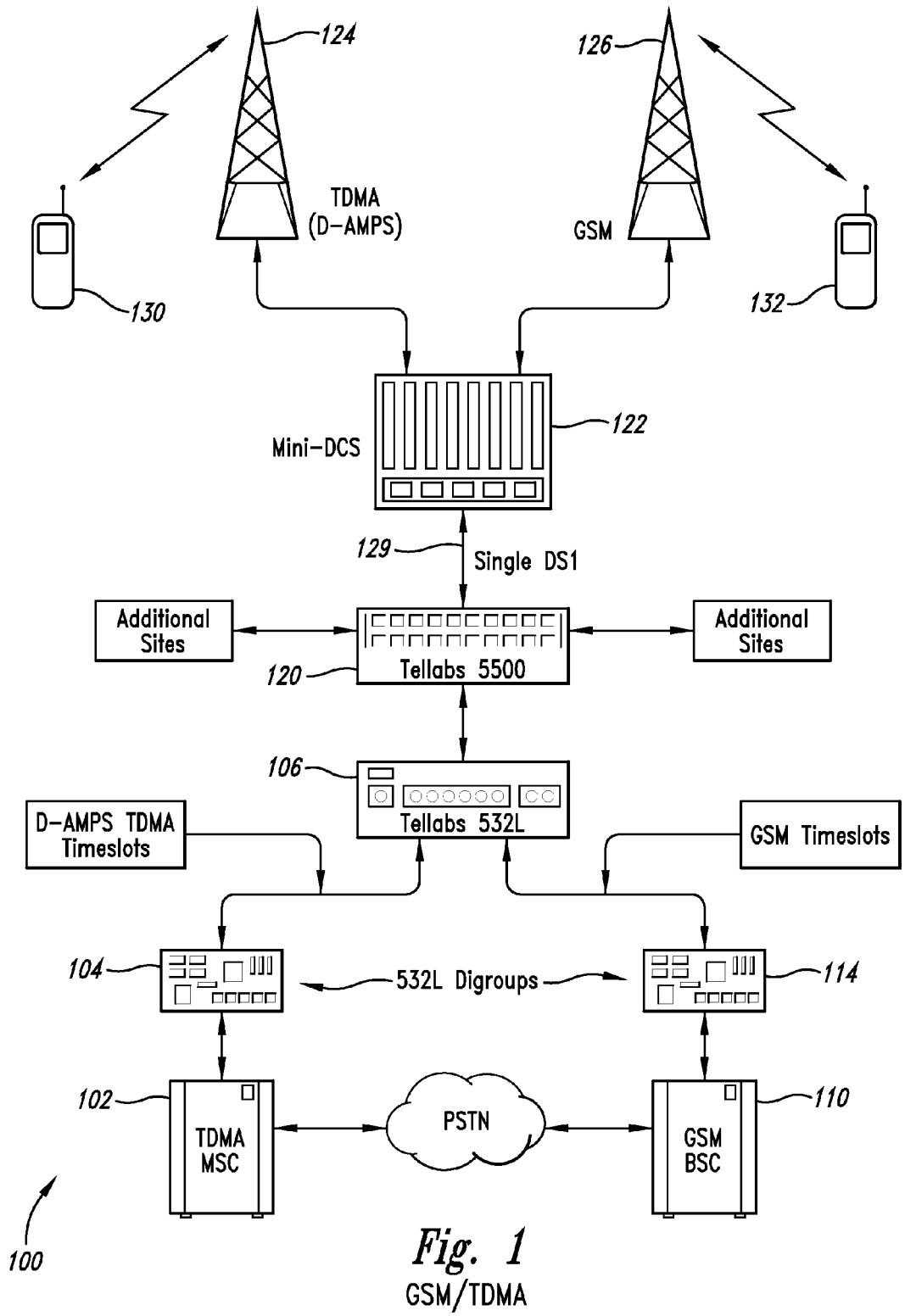
FIG. 1 is a schematic diagram of a wireless communication system configured to transmit and receive communication signals associated with a Digital Advanced Mobile Phone System (D-AMPS) standard and a Global System for Mobile Communication (GSM) standard.

With reference to FIG. 1, a communication system 100 is configured based on GSM and D-AMPS, but other data or voice standards can be included such as, for example, the Personal Digital Cellular (PCS) standard, the Integrated Digital Enhanced Network (IDEN) standard, Internet Protocol (IP), or other standards. A mobile switching center (MSC) 102 is configured to receive voice and/or data or other signals associated with D-AMPS and deliver these signals to D-AMPS processor 104 of a digital cross-connect system (DCS) 106 such as, for example, a broadband digital cross-connect system such as a Tellabs 532L available from Tellabs, Inc., Naperville, Ill. The DCS 106 can be used to terminate DS-1, DS-3, and/or STS-1 signals and perform a cross-connect function at a DS0 signal rate. Cross-connections can be selected via instructions provided to the DCS 106 from, for example, a local central office or other location, such as an operations center. Services can be provided by the DCS 106 in association with so-called T-1 or E-1 rates. Typically, the DCS 106 can support numerous DS1 equivalents. The DCS 106 also includes a GSM processor 114 configured to receive signals based on a GSM standard from a base station controller (BSC) 110. The DCS 106 is configured to combine D-AMPS signals, GSM signals, and associated control signals received from the processors 104, 114, and to distribute separated signals to the processors 104, 114 for forward or reverse channel communication. As shown in FIG. 1, the processors 104, 114 are each configured to process signals for up to twelve channels of a 24-channel DS1 level.

Figure 4:
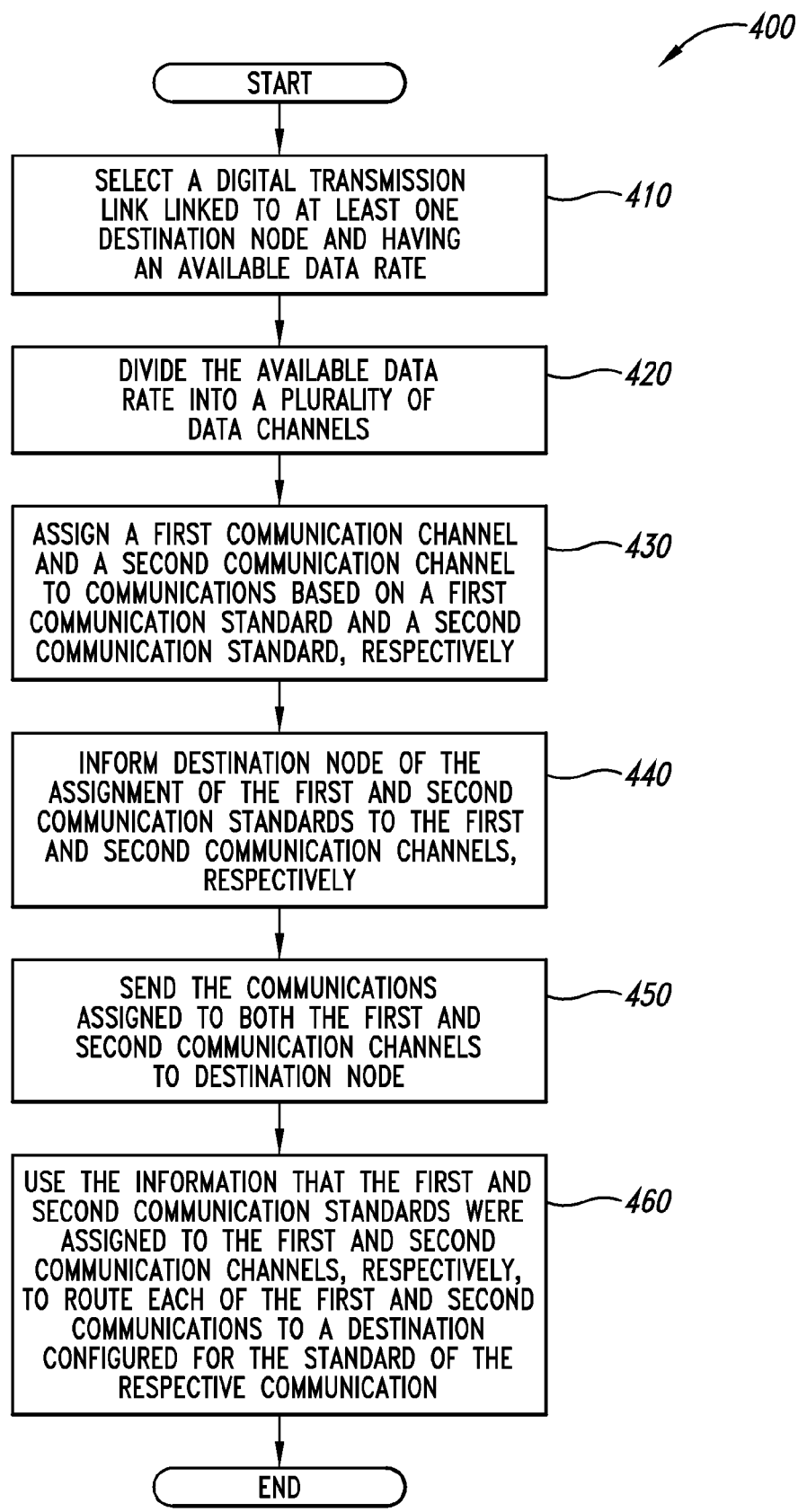
FIG. 4 is a flow diagram of a communication method constructed in accordance with the present invention.

The combined GSM/D-AMPS signals are provided to a broadband cross-connect 120 such as a Tellabs 5500 that directs signal portions to selected cells FIG. 4, block 450). A narrowband digital cross-connect (DCS) 122, such as, for example, an Adit 600 available from Carrier Access Corporation, Boulder, Colo., receives combined signals selected for delivery to antennas 124, 126 at a selected cell site so that D-AMPS portion are delivered to a D-AMPS antenna 124, and GSM portions are delivered to a GSM antenna 126, respectively, that transmit signals to and receive signals from respective mobile stations 130, 132 (FIG. 4, block 460). The antennas 124, 126 are illustrated on separate towers, but typically the antennas 124, 126 are supported on a single tower.

Digital signals in the system 100 are conveniently described with reference to a digital signal level DS0 that provides digital voice/data/control at a rate of 64 kbit/sec and a digital signal level DS1 that provides digital voice/data/control at a rate of about 1.544 Mbit/sec. In the example of FIG. 1, the DCS 106 and the DCS 122 are configured to receive and combine as many as 24 DS0 signals or to receive a DS1 signal and extract as many as 24 DS0 signals so that the DCS 122 and the broadband cross-connect 106 can communicate GSM and D-AMPS voice/data over a single DS1 connection 129. In additional examples, the DSC 106 and the DSC 122 can be configured to combine signals into one or more DS1 signals or to extract DS0 signals from several DS1 signals.

Figure 2:
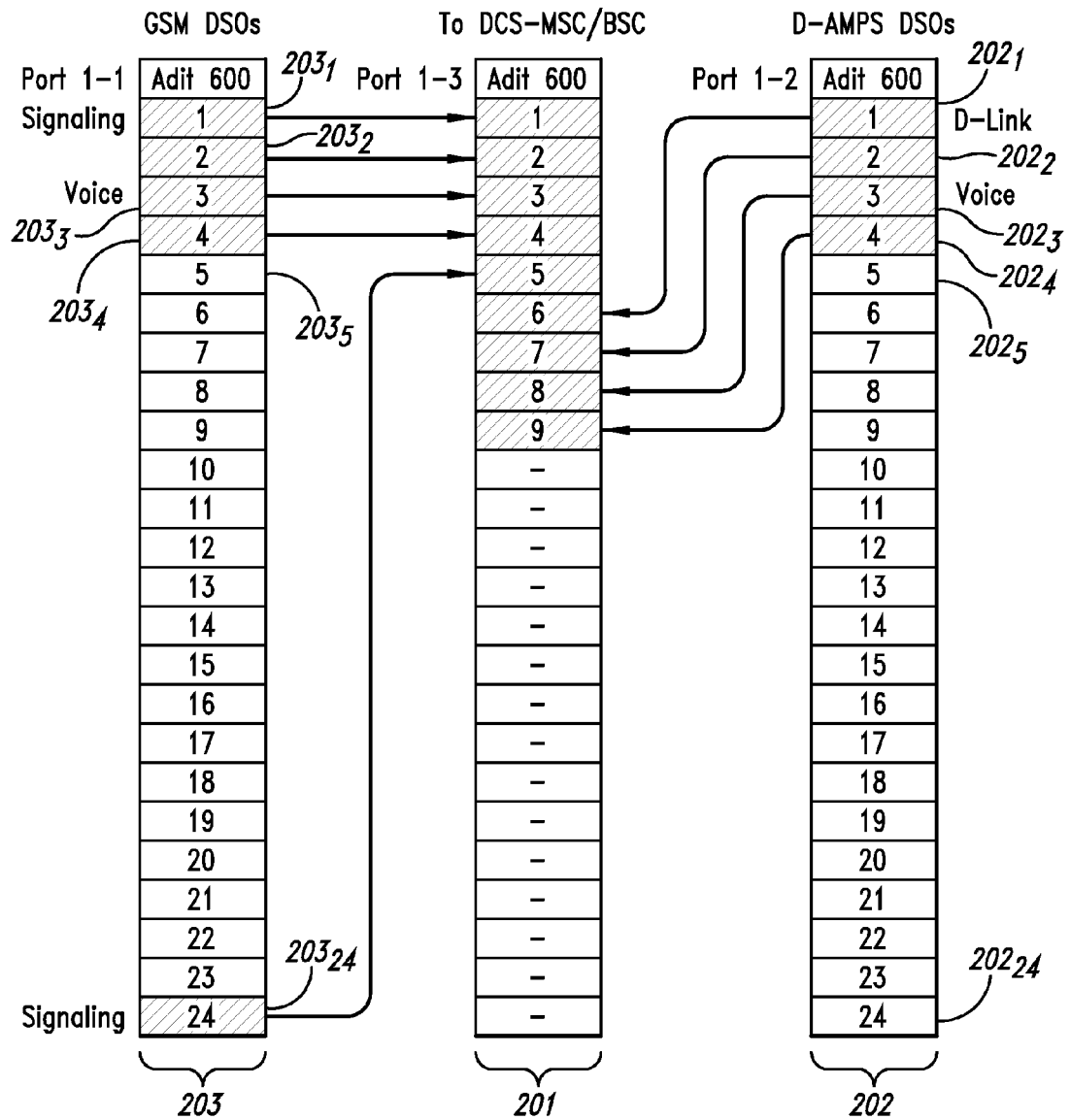
FIG. 2 is a schematic diagram illustrating a representative assignment of DAMPS and GSM signals to time slots in a DS1 signal.

Combination and separation of D-AMPS and GSM signals are described with reference to FIG. 2. For convenience, FIG. 2 illustrates formation of a DS1 signal 201 from a set of DS0 signals 202 provided by a D-AMPS based network and a set of DS0 signals 203 provided by a GSM-based network. Either of the sets 202, 203 can include as many as 24 DS0 equivalents, but in order to combine the D-AMPS and the GSM signals into a single DS1 signal, a total number of timeslots used by the sets 202, 203 is less than twenty four. Typically, the D-AMPS set 202 and the GSM set 203 are associated with respective DS1 rate signals in which one or more time slots are unoccupied.

As shown in FIG. 2, D-AMPS time slots $202_3$, $202_4$ are associated with voice communication, and time slots $202_1$, $202_2$ are associated with a data link. Time slots $202_5$-$202_{24}$ are unused. The GSM set 203 includes time slots $203_3$, $203_4$ associated with voice channels and time slots $203_1$, $203_2$, and $203_{24}$ that are associated with signaling. Time slots $203_5$-$203_{23}$ are unused. In the representative mapping of FIG. 2, time slots $203_1$-$203_4$, $203_{24}$ and $202_1$-$202_4$ of the GSM set 203 and the D-AMPS set 202 are mapped to respective time slots $201_1$-$201_9$ of the DS1 signal 201. A similar DS1 signal that is received can be similarly unmapped and associated mappings and unmappings can be executed by the DSC 106 and the DSC 122.

The mapping of FIG. 2 can be selected based on DS0 mappings in the BSC 110 that can be determined by, for example, issuing computer executable instructions to request that timeslots used for signaling paths and voice paths be reported (FIG. 4, block 440). Additional computer executable instructions can be provided to determine the state of radio transmitters/receivers and an associated pulse code modulation. In a representative example, a first DS0 slot and a second DS0 slot are used for D-link control, and the remaining voice paths can be identified using computer executable instructions. As noted above, GSM signals and D-AMPS signals can be combined into a single DS1 signal or extracted from a DS1 signal to form two DS1 signals.

The preceding example provides connection of GSM and D-AMPS signals to a cell site via a single DS1 connection. In other examples, additional signal types can be included so that communication of multi-standard data can be performed using a common communication link such as a DS1 link. In additional examples, multi-standard data is mapped into time slots of one or more DS1 or higher signal levels. The above example is described with reference to D-AMPS and GSM, but signals associated with other signal types can be similarly mapped into time slots of one or more DS1 levels, or otherwise combined.

Figure 3:
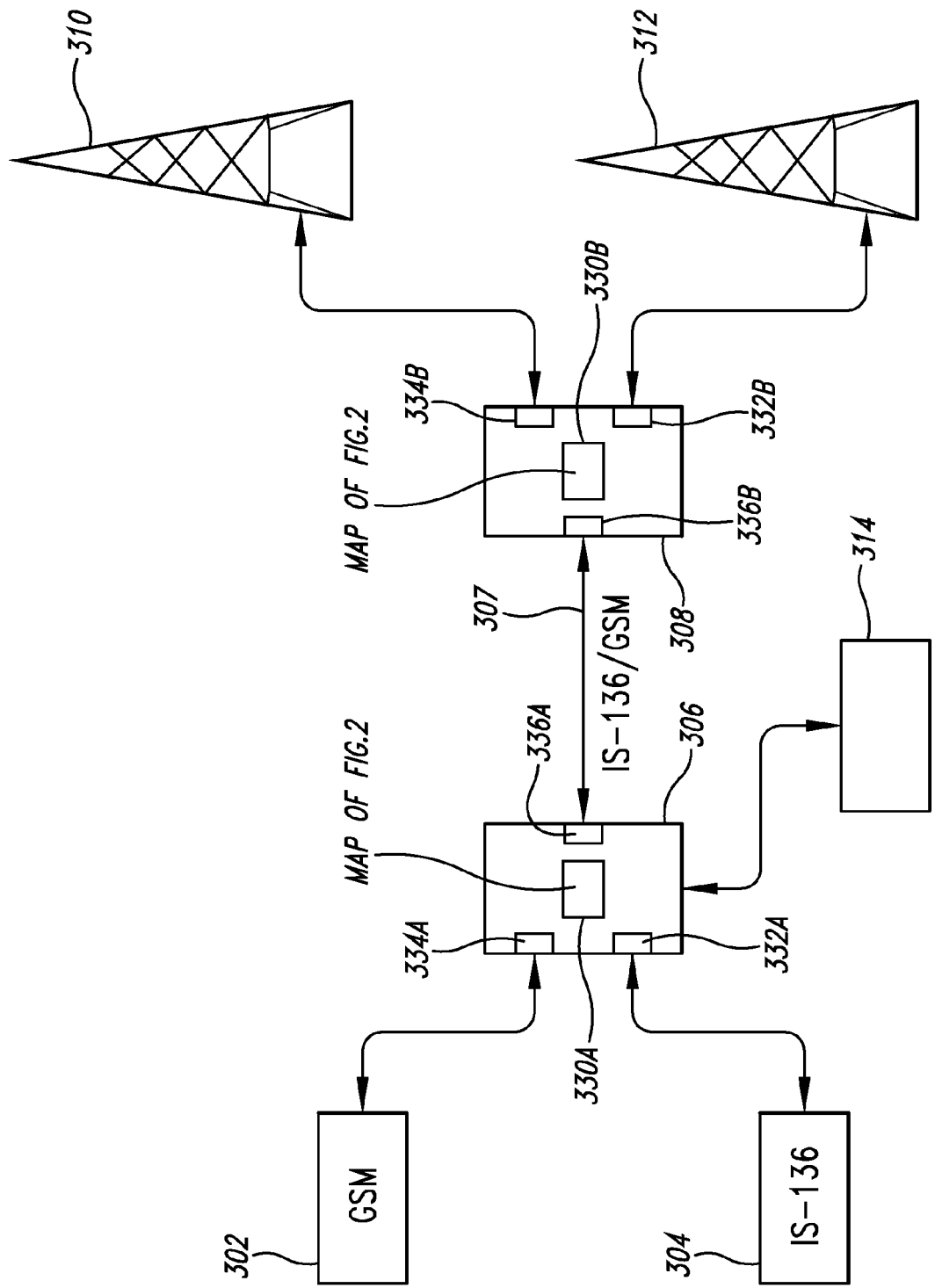
FIG. 3 is a schematic block diagram of a multi-standard mobile communication system that includes a controller configured to selected numbers of channels assigned to one or more mobile standards.

With reference to FIG. 3, a multi-standard mobile communication system 300 includes a GSM-based switching center 302 and an IS-136 based switching center 304 that are in communication with a digital access and cross-connect system (DACS) 306. The DACS 306 is in communication with a DACS 308 via a digital link 307 (FIG. 4, block 450). The DACS is in communication with a GSM-based transmitter/antenna 310 and an IS-136-based transmitter/antenna 312. The DACS 306 is configured to receive communications from the switching centers 302, 304 are assigned the communications to channels defined on the communication link 307. Typically, the communication link 307 is associated with a so-called digital signal (DS) level, such as a DS-1 level that can provide twenty four channels having data rates of about 64 kbit/sec, but the communication link can be configured based on higher or lower bit rates. Communication link channels are conveniently defined as time slots in the DS-1 or other signal level, and one or more of the channels can be assigned to communications with the switching centers 302, 304. A controller 314 can be configured to communicate with the DACS 306 and estimate numbers of channels needed to maintain appropriate service levels with each of the switching centers 302, 304. Based upon these estimates, the controller 314 can direct the DACS 306 and the DACS 308 to reallocated channels based upon current network requirements (FIG. 4, block 440 and 460). For examples, if GSM-based service is added to a mobile network, then the initial GSM usage is likely to be relatively low, and only a few channels can be assigned to GSM communications. As GSM usage grows, additional channels can be allocated to GSM communication. As older services become less well used, channels allocated to these older services can be allocated to services having higher demands. The controller can be configured to prompt channel reallocation, or to report usage statistics to a channel operator who can approve requested changes in allocation, or otherwise reallocate capacity. In some cases, the controller is configured to interrogate system components to determine existing channel allocations prior to altering channel assignments.

Multiplexers 306 and 308 for wireless communication comprise a first input 332A and 332B, respectively configured to receive a communication based on a first communication standard and insert the received first communication into a first channel defined on a transmission link 307. A second input 334A and 334B is configured to receive a communication based on a second communication standard and insert the received second communication into a second channel defined on the transmission link 307. In representative examples, an output 336A and 336B is configured to deliver the first communication and the second communication to a destination (FIG. 4, block 450). According to representative examples, the first communication standard is based on a GSM standard or an IS-136 standard. In other examples, the first communication standard is an analog communication standard. In additional examples, the transmission link is based on a T-1 level or an E-1 level.

Figure 5:
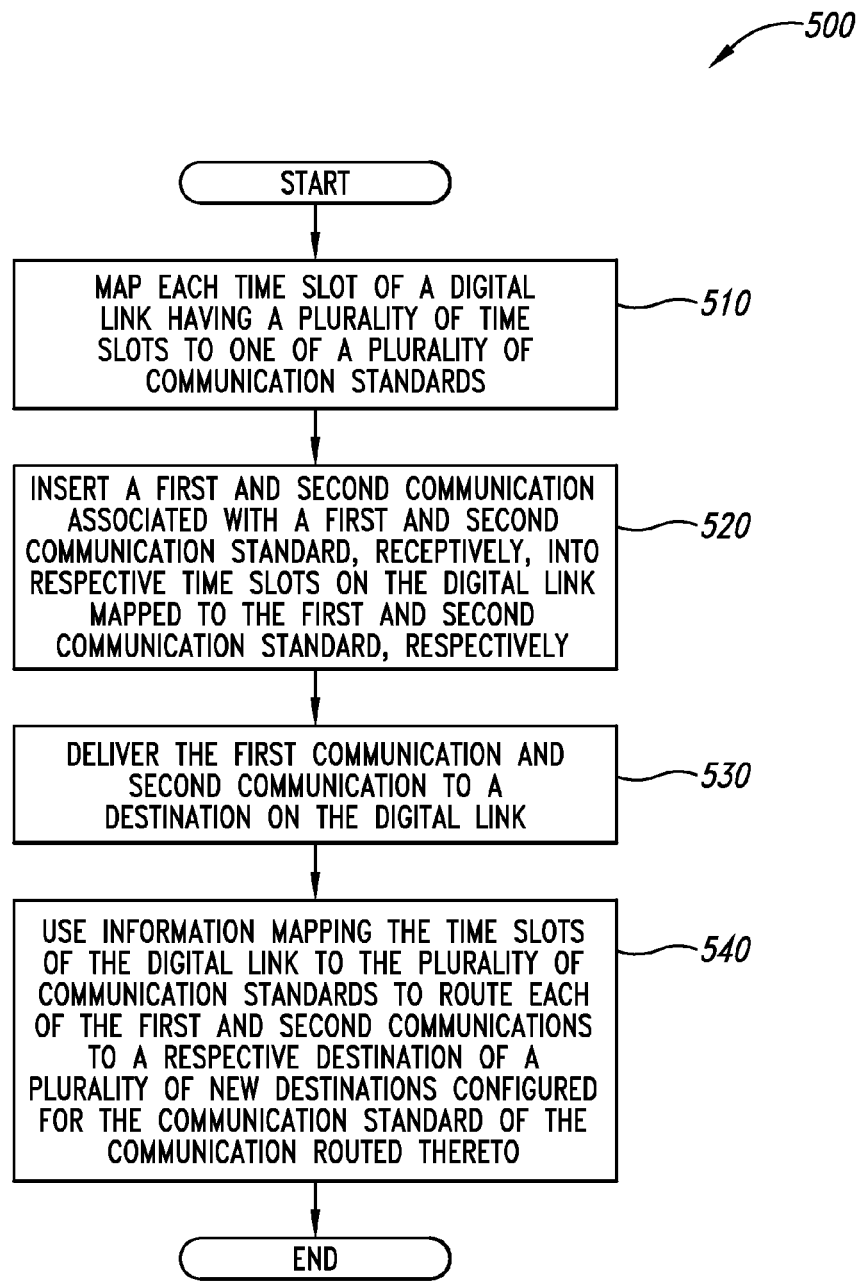
FIG. 5 is a flow diagram of a method of processing communications for wireless distribution constructed in accordance with the present invention.

Methods of processing communications for wireless distribution comprise extracting a first communication and a second communication associated with a first communication standard and a second communication standard, respectively, from a transmission link 307 (FIG. 4, block 460). The first communication and second communication are delivered to a first radio transmitter and a second radio transmitter, respectively (FIG. 4, block 460). Additional methods of processing communications for wireless distribution comprise inserting a first communication and a second communication associated with a first communication standard and a second communication standard, respectively, into respective time slots on a digital link (FIG. 5, block 520). The first communication and the second communication are delivered to a destination on the digital link (FIG. 5, block 530). In representative examples, the digital link is associated with an E-1 or a T-1 level.

Methods of allocating digital link capacity comprise dividing a digital link into a plurality of channels and assigning communications based on at least two mobile standards to respective channels (FIG. 4, blocks 420-430). In some examples, the channels are associated with time slots defined in the digital link (FIG. 5, block 510). In representative examples, the digital link is based on a T-1 level and is divided into twenty-four channels. In additional examples, the digital link is based on an E-1 level and is divided into thirty-two channels. In additional representative examples, the at least two mobile standards include at least one of IS-136, GSM, and IS-95.

Multi-standard mobile communication systems comprise a cell site having a first radio transmitter and a second radio transmitter associated with a first mobile standard and a second mobile standard, respectively. A digital link that is configured to communicate with the cell site has at least one channel assigned to the first mobile standard and at least one channel assigned to the second mobile standard. A controller is configured to select a number of channels assigned to the first communication standard and the second communication standard.

Demultiplexers for wireless communication comprise an input configured to receive a signal associated with a digital link. A processor is configured to identify a communication associated with a first channel of the digital link and a communication associated with a second channel of a communication link (FIG. 4, block 460 and 540). A first output is configured to receive the communication associated with the first channel of the digital link, and a second output is configured to receive the communication associated with the second channel. In representative examples, the first communication is associated with a first communication standard and the second communication is associated with a second communication standard that is different than the first communication standard. In particular examples, at least one of the first and second communication standards is a GSM standard or an IS-136 standard. In additional examples, the processor is configured to identify communications based on channels defined in a T-1 or and E-1 level.

Methods of sharing transmission capacity of a transmission medium comprise selecting a first communication protocol and a second communication protocol, and assigning portions of the transmission capacity to the first communication protocol and the second communication protocol. In some examples, the transmission medium is associated with a T-1 level. In other examples, at least one of the first and second communication protocols is associated with a GSM standard, an IS-136 standard, or an IS-95 standard. In a particular example, the first protocol is an IS-136 protocol and the second protocol is a GSM protocol. In another representative example, the first protocol is a W-CDMA protocol and the second protocol is a GSM protocol. In yet another representative example, the first protocol is an IS-95 protocol and the second protocol is a W-CDMA protocol or the first protocol is a GSM protocol and the second protocol is a cdma2000 protocol.

It will be apparent that the representative methods and apparatus described above can be modified in arrangement and detail, and I claim all that is encompassed by the appended claims.

We claim:

1. A method of processing communications for wireless distribution, comprising:
    mapping each time slot of a digital link having a plurality of time slots to one of a plurality of communication standards;
    inserting a first communication and a second communication associated with a first communication standard of the plurality of communication standards and a second communication standard of the plurality of communication standards, respectively, into respective time slots on the digital link mapped to the first communication standard and second communication standard, respectively; and
    delivering the first communication and second communication to a destination on the digital link.

2. The method of claim 1, wherein the digital link is associated with an E-1 or a T-1 level.

3. The method of processing communication for wireless distribution of claim 1, wherein the destination has information mapping the time slots of the digital link to the plurality of communication standards.

4. The method of processing communication for wireless distribution of claim 3, further comprising at the destination, using the information mapping the time slots of the digital link to the plurality of communication standards to route each of the first communication and the second communication to a respective destination of a plurality of new destinations configured for the communication standard of the communication routed thereto.

5. A communication method, comprising:
    selecting a digital transmission link linked to at least one destination node having an available data rate;
    dividing the available data rate into a plurality of data channels;
    assigning a first communication channel of the plurality of data channels to communications based on a GSM communication standard;
    assigning a second communication channel of the plurality of data channels to communications based on a IS-136 communication standard; and
    informing the at least one destination node of the assignment of the GSM communication standard to the first communication channel and the assignment of the IS-136 communication standard to the second communication channel.

6. The communication method of claim 5, further comprising:
    sending the communications assigned to both the first communication channel and the second communication channel to the at least one destination node; and
    at the at least one destination node, identifying the communications of the first communication channel as being in the GSM communication standard and the communications of the second communication channel as being in the IS-136 communication standard.

7. The communication method of claim 5, further comprising:
    sending the communications assigned to both the first communication channel and the second communication channel to the at least one destination node; and
    at the at least one destination node, using the information that the GSM communication standard was assigned to the first communication channel and the IS-136 communication standard was assigned to the second communication channel to route the first communication channel to a second destination configured for the GSM communication standard and to route the second communication channel to a third destination configured for the IS-136 communication standard.

8. A multiplexer for wireless communication, comprising:
    a map configured to map each channel of a plurality of channels of a digital transmission link to one of a plurality of communication standards;
    a first input configured to receive a first communication based on a GSM communication standard of the plurality of communication standards and use the map to communicate the received first communication over a first channel of the digital transmission link, the first channel being mapped to the GSM communication standard; and a second input configured to receive a second communication based on a second communication standard of the plurality of communication standards and use the map to communicate the received second communication over a second channel of the digital transmission link, the second channel being mapped to the second communication standard.

9. The method of claim 8, wherein the second communication standard corresponds to an IS-136 standard.

10. A multiplexer for wireless communication, comprising:

a map configured to map each channel of a plurality of channels of a digital transmission link to one of a plurality of communication standards;

a first input configured to receive a first communication based on a IS-136 communication standard of the plurality of communication standards and use the map to communicate the received first communication over a first channel of the digital transmission link, the first channel being mapped to the IS-136 communication standard; and a second input configured to receive a second communication based on a second communication standard of the plurality of communication standards and use the map to communicate the received second communication over a second channel of the digital transmission link, the second channel being mapped to the second communication standard.

* * * * *